US012094054B2

(12) United States Patent
Tsai et al.

(10) Patent No.: US 12,094,054 B2
(45) Date of Patent: Sep. 17, 2024

(54) NEURAL LIGHT TRANSPORT

(71) Applicant: GOOGLE LLC, Mountain View, CA (US)

(72) Inventors: Yun-Ta Tsai, Los Gatos, CA (US); Xiuming Zhang, Palo Alto, CA (US); Jonathan T. Barron, Alameda, CA (US); Sean Fanello, San Francisco, CA (US); Tiancheng Sun, Bellevue, CA (US); Tianfan Xue, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 97 days.

(21) Appl. No.: 17/639,967

(22) PCT Filed: May 4, 2020

(86) PCT No.: PCT/US2020/031331
§ 371 (c)(1),
(2) Date: Mar. 3, 2022

(87) PCT Pub. No.: WO2021/066882
PCT Pub. Date: Apr. 8, 2021

(65) Prior Publication Data
US 2022/0327769 A1 Oct. 13, 2022

Related U.S. Application Data

(60) Provisional application No. 62/910,265, filed on Oct. 3, 2019.

(51) Int. Cl.
*G06T 15/50* (2011.01)
*G06N 3/084* (2023.01)
*G06T 15/04* (2011.01)
*G06T 15/20* (2011.01)

(52) U.S. Cl.
CPC .......... *G06T 15/506* (2013.01); *G06N 3/084* (2013.01); *G06T 15/04* (2013.01); *G06T 15/205* (2013.01);
(Continued)

(58) Field of Classification Search
None
See application file for complete search history.

(56) References Cited

U.S. PATENT DOCUMENTS 11,403,811 B1 * 8/2022 Upchurch ............... G06N 3/084
2012/0287247 A1 * 11/2012 Stenger ................ H04N 13/128
348/47
(Continued)

OTHER PUBLICATIONS

Akenine-Möller et al., "Sparse Lumigraph Relighting by Illumination and Reflectance Estimation from Multi-View Images," Eurographics Symposium on Rendering (2006), pp. 1-10 (Year: 2006).*
(Continued)

*Primary Examiner* — Anh-Tuan V Nguyen
(74) *Attorney, Agent, or Firm* — McDonnell Boehnen Hulbert & Berghoff LLP

(57) ABSTRACT

Examples relate to implementations of a neural light transport. A computing system may obtain data indicative of a plurality of UV texture maps and a geometry of an object. Each UV texture map depicts the object from a perspective of a plurality of perspectives. The computing system may train a neural network to learn a light transport function using the data. The light transport function may be a continuous function that specifies how light interacts with the object when the object is viewed from the plurality of perspectives. The computing system may generate an output UV texture map that depicts the object from a synthesized perspective based on an application of the light transport function by the trained neural network.

20 Claims, 14 Drawing Sheets

(52) U.S. Cl.
 CPC ...... *G06T 2200/04* (2013.01); *G06T 2200/08* (2013.01); *G06T 2200/24* (2013.01)

(56) References Cited

U.S. PATENT DOCUMENTS

| | | | |
|---|---|---|---|
| 2013/0335434 A1* | 12/2013 | Wang | G06T 15/506 345/581 |
| 2015/0193967 A1* | 7/2015 | Wang | G06N 20/00 345/426 |
| 2016/0042559 A1* | 2/2016 | Seibert | G06T 15/506 345/426 |
| 2018/0068675 A1* | 3/2018 | Variani | G10L 19/008 |
| 2018/0359416 A1* | 12/2018 | Hold-Geoffroy | G06V 10/764 |
| 2019/0035149 A1* | 1/2019 | Chen | G06V 40/166 |
| 2019/0213772 A1 | 7/2019 | Lombardi et al. | |
| 2019/0340810 A1* | 11/2019 | Sunkavalli | G06T 15/506 |
| 2021/0012561 A1* | 1/2021 | Sunkavalli | G06T 7/55 |

OTHER PUBLICATIONS

The International Search Report (ISR) with Written Opinion for PCT/US2020/031331 dated Sep. 4, 2020, pp. 1-20.
Meka, Abhimitra et al. "Deep reflectance fields" ACM Transactions on Graphics (2019) vol. 38, No. 4, pp. 1-12.
Chen, Zhang et al. "A Neural Rendering Framework for Free-Viewpoint Relighting" arxiv.org (2019), XP081539860.
Thies, Justus et al. "IGNOR: Image-guided Neural Object Rendering" arxiv. org (2018) XP080939239.

* cited by examiner

Figure 4B

NEURAL LIGHT TRANSPORT

CROSS-REFERENCE TO RELATED APPLICATIONS

This application is a U.S. National Phase of International Application No. PCT/US2020/031331, filed May 4, 2020, which claims priority to U.S. Provisional Application No. 62/910,265, filed Oct. 3, 2019, all of which are incorporated by reference herein in their entirety.

BACKGROUND

Many modern computing devices, including mobile phones, personal computers, and tablets, include image capture devices, such as still and/or video cameras. The image capture devices can capture images, such as images that include people, animals, landscapes, and/or objects.

Some image capture devices and/or computing devices can correct or otherwise modify captured images. For example, some image capture devices can provide "red-eye" correction that removes artifacts such as red-appearing eyes of people and animals that may be present in images captured using bright lights, such as flash lighting. After a captured image has been corrected, the corrected image can be saved, displayed, transmitted, printed to paper, and/or otherwise utilized. In some cases, an image of an object may suffer from poor lighting during image capture.

SUMMARY

Disclosed herein are embodiments that relate to developing a neural light transport that enables the digital relighting and free-viewpoint rendering of a three-dimensional (3D) subject captured in an image. Particularly, to train a neural network to learn a light transport function, a computing system may use a dataset associated with a set of UV texture maps depicting an object that were captured using a light stage. The dataset may specify the perspective of the camera and the position of the light illuminating the object for each UV texture map within the set of UV texture maps. By using the dataset, one or more neural networks may develop the neural light transport that can subsequently be used to synthesize the texture of the object from a novel perspective and/or novel lighting. The synthesized texture map can then be applied to a 3D model of the object for relighting to produce an output texture map of the object from a synthesized perspective (e.g., novel perspective and lighting).

In one aspect, the present application describes a method. The method involves obtaining, at a computing system, data indicative of a plurality of UV texture maps and a geometry of an object. Each UV texture map depicts the object from a perspective of a plurality of perspectives. The method may also involve training, by the computing system, a neural network to learn a light transport function using the data. The light transport function specifies how light interacts with the object when the object is viewed from the plurality of perspectives. The method may also involve generating, by the computing system, an output UV texture map that depicts the object from a synthesized perspective based on an application of the light transport function by the trained neural network.

In another aspect, the present application describes a system. The system includes a sensor and a computing system. The computing system is configured to obtain data indicative of a plurality of UV texture maps and a geometry of an object. Each UV texture map depicts the object from a perspective of a plurality of perspectives, and the sensor captures data indicative of the geometry of the object. The computing system is further configured to train a neural network to learn a light transport function using the data. The light transport function specifies how light interacts with the object when the object is viewed from the plurality of perspectives. The computing system is also configured to generate an output UV texture map that depicts the object from a synthesized perspective based on an application of the light transport function by the trained neural network.

In yet another example, the present application describes a non-transitory computer-readable medium configured to store instructions, that when executed by a computing system comprising one or more processors, causes the computing system to perform operations. The operations involve obtaining data indicative of a plurality of UV texture maps and a geometry of an object. Each UV texture map depicts the object from a perspective of a plurality of perspectives. The operations also involve training a neural network to learn a light transport function using the data. The light transport function specifies how light interacts with the object when the object is viewed from the plurality of perspectives. The operations also involve generating an output UV texture map that depicts the object from a synthesized perspective based on an application of the light transport function by the trained neural network.

In another aspect, the present application describes a system comprising means for implementing a neural light transport. The system comprises means for obtaining data indicative of a plurality of UV texture maps and a geometry of an object. Each UV texture map depicts the object from a perspective of a plurality of perspectives. The system also includes means for training a neural network to learn a light transport function using the data. The light transport function specifies how light interacts with the object when the object is viewed from the plurality of perspectives. The system also includes means for generating an output UV texture map that depicts the object from a synthesized perspective based on an application of the light transport function by the trained neural network.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4B depicts a convolution, in accordance with example embodiments

DETAILED DESCRIPTION

Figure 1:
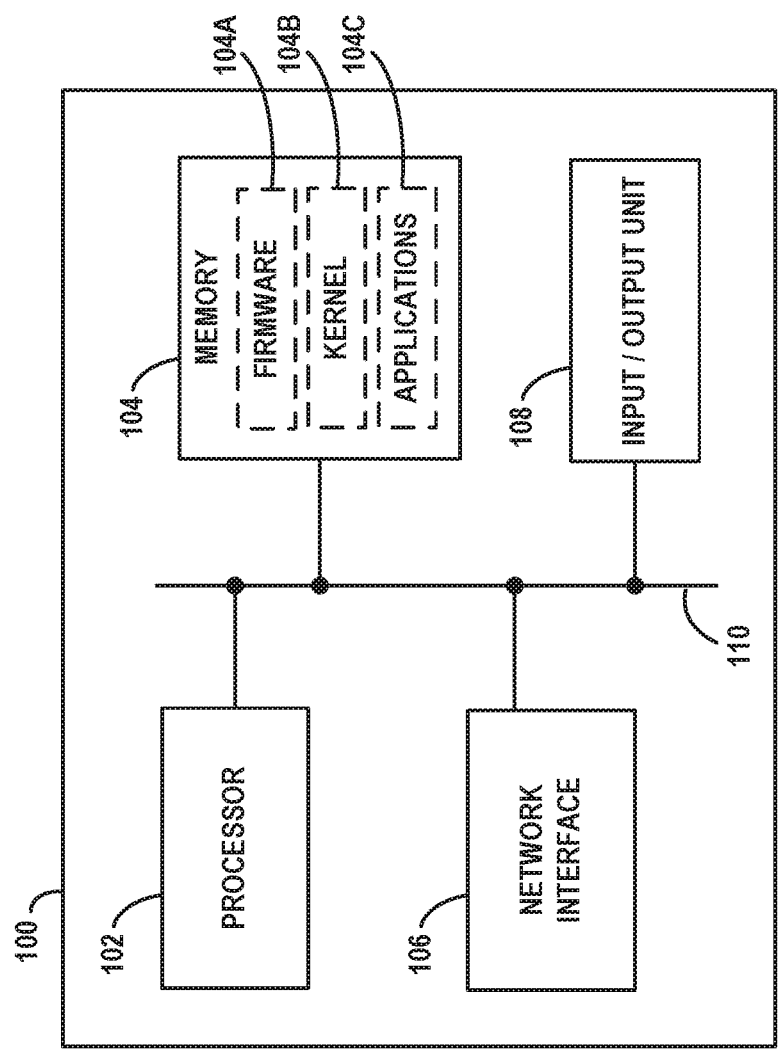
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

A light stage and/or other hardware can be used to capture a fully relightable object. During the capture time, however, the object remains static. In addition, a light stage may include a limited number of lights installed. As a result, the light stage might capture an object from only predefined views, therefore limiting the development of an all-angle relighting system.

Examples presented herein describe methods and systems for implementing a neural light transport. A computing system may train a neural network to learn a light transport function, also referred herein as a neural light transport. The light transport function may be a function (e.g., a continuous function) that specifies how light interacts with an object when the object is viewed from various perspectives. For example, the light transport function may enable a computing system to describe how a ray of light interacts with the material of an object and at the perspective of a viewer. As such, the light transport function can be used to generate a representation (e.g., an image or a UV texture map) of an object that depicts the object from a synthesized perspective. For instance, the synthesized perspective may show the object using novel lighting (i.e., illumination from a light source at a new position), with one or more of the materials of the object modified or changed and/or a novel perspective (e.g., from a viewpoint of the object that has not been previously captured and recorded via a camera).

An example method may involve obtaining data indicative of images of an object. Each image may depict the object from a different perspective. For example, the data may be gathered using a light stage. Particularly, the light stage may enable developing a One-Light-at-a-Time dataset that represents UV texture maps generated based on images captured from various fixed and known perspectives (e.g., dozens of perspectives) while lights positioned proximate to the light stage illuminate the object in a known order (e.g., one light at a time). As a result, the data may specify information regarding the perspective of the camera (e.g., camera pose) and the pose of the particular light or lights illuminating the object for each image. In addition, one or more sensors can provide data that represents geometry of the object. Together, the UV texture maps and geometry information can form a dataset that a computing system can use to train one or more neural networks to learn a light transport function.

The trained neural network can then generate an output UV texture map that depicts the object from a synthesized perspective. For example, the light transport function may enable the computing system to synthesize the texture of a novel view and novel lighting of the object, which can then be applied to a 3D model of the object for relighting or novel view synthesis. In addition, the synthesized perspective may be used to show the object with one or more different materials in some examples.

I. Example Computing Devices and Cloud-Based Computing Environments

The following embodiments describe architectural and operational aspects of example computing devices and systems that may employ the disclosed ANN implementations, as well as the features and advantages thereof.

FIG. 1 is a simplified block diagram exemplifying a computing system 100, illustrating some of the components that could be included in a computing device arranged to operate in accordance with the embodiments herein. Computing system 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing system 100 includes processor 102, memory 104, network interface 106, and an input/output unit 108, all of which may be coupled by a system bus 110 or a similar mechanism. In some embodiments, computing system 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples.

Computing system 100 may include fixed memory as well as one or more removable memory units, the latter including but not limited to various types of secure digital (SD) cards.

Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing system 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing system 100. Applications 104C may be one or more userspace software programs, such as web browsers or email clients, as well as any software libraries used by these programs. In some examples, applications 104C may include one or more neural network applications. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing system 100 may include Ethernet, BLUETOOTH®, and Wifi interfaces.

Input/output unit 108 may facilitate user and peripheral device interaction with computing system 100 and/or other computing systems. Input/output unit 108 may include one or more types of input devices, such as a keyboard, a mouse, one or more touch screens, sensors, biometric sensors, and so on. Similarly, input/output unit 108 may include one or more types of output devices, such as a screen, monitor, printer, and/or one or more light emitting diodes (LEDs). Additionally or alternatively, computing system 100 may communicate with other devices using a universal serial bus (USB) or high-definition multimedia interface (HDMI) port interface, for example.

In some embodiments, one or more instances of computing system 100 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing system 100 may enable performance of embodiments described herein, including using neural networks and implementing a neural light transport.

Figure 2:
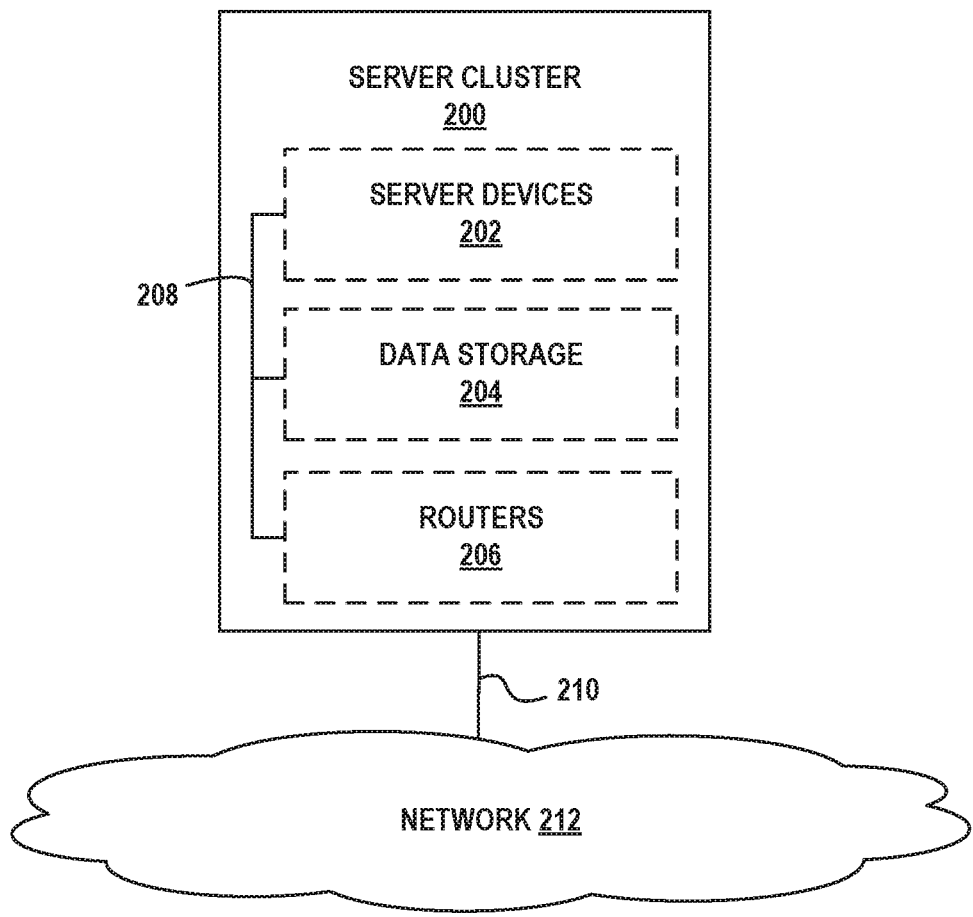
FIG. 2 illustrates a schematic drawing of a server device cluster, in accordance with example embodiments.

FIG. 2 depicts a cloud-based server cluster 200 in accordance with example embodiments. In FIG. 2, one or more operations of a computing device (e.g., computing system 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200. In some examples, server cluster 200 may perform one or more operations described herein, including the use of neural networks and implementation of a neural light transport function.

Server devices 202 can be configured to perform various computing tasks of computing system 100. For example, one or more computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

II. Artificial Neural Network

A. Example ANN

An artificial neural network (ANN) is a computational model in which a number of simple units, working individually in parallel and without central control, can combine to solve complex problems. An ANN is represented as a number of nodes that are arranged into a number of layers, with connections between the nodes of adjacent layers.

Figure 3A:
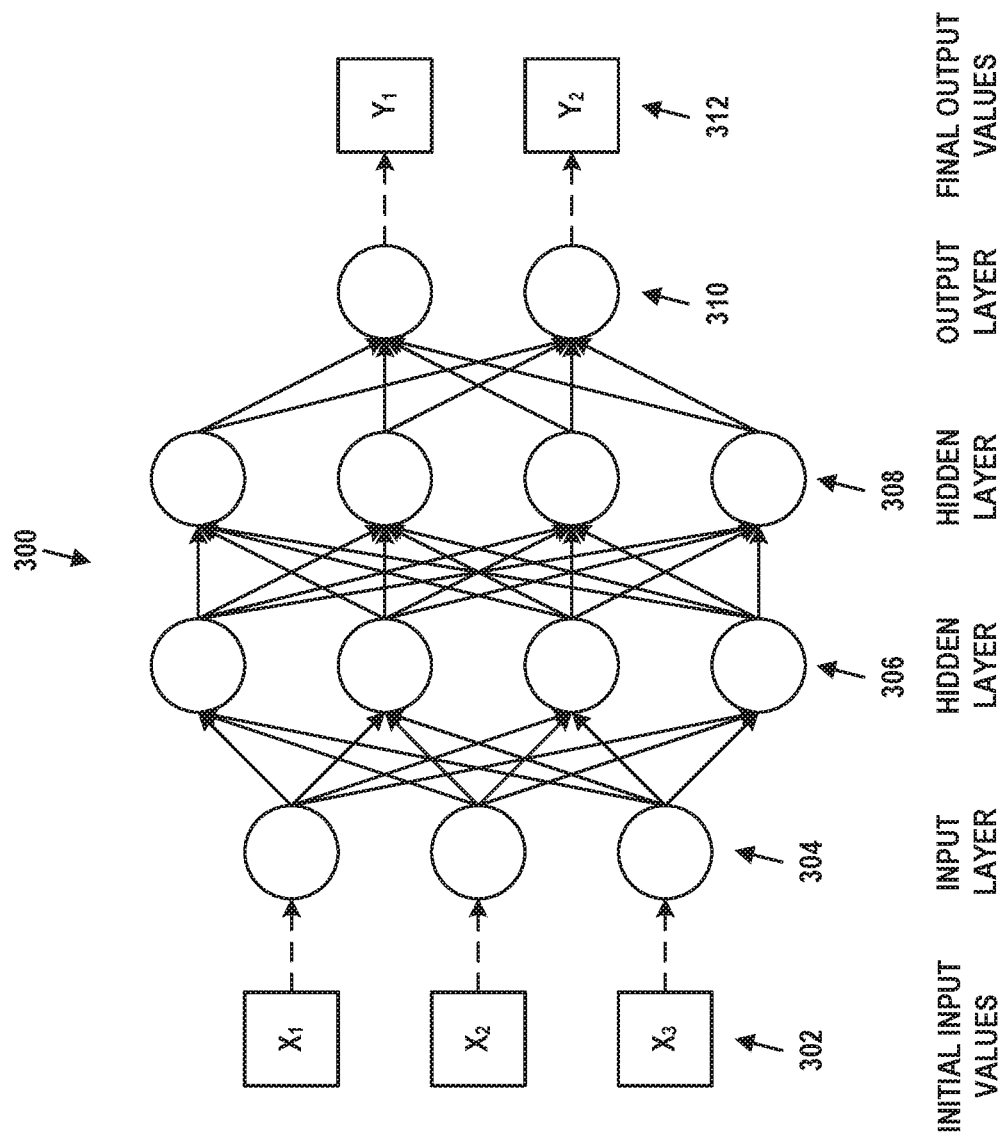
FIG. 3A depicts an ANN architecture, in accordance with example embodiments.

An example ANN 300 is shown in FIG. 3A. Particularly, ANN 300 represents a feed-forward multilayer neural network, but similar structures and principles are used in convolution neural networks (CNNs), recurrent neural networks, and recursive neural networks, for example. ANN 300 can represent an ANN trained to perform particular tasks, such as image processing techniques (e.g., segmentation, semantic segmentation, image enhancements) or learning neural light transport functions described herein. In further examples, ANN 300 can learn to perform other tasks, such as computer vision, risk evaluation, etc.

As shown in FIG. 3A, ANN 300 consists of four layers: input layer 304, hidden layer 306, hidden layer 308, and output layer 310. The three nodes of input layer 304 respectively receive $X_1$, $X_2$, and $X_3$ as initial input values 302. The two nodes of output layer 310 respectively produce $Y_1$ and $Y_2$ as final output values 312. As such, ANN 300 is a fully-connected network, in that nodes of each layer aside from input layer 304 receive input from all nodes in the previous layer.

The solid arrows between pairs of nodes represent connections through which intermediate values flow, and are each associated with a respective weight that is applied to the respective intermediate value. Each node performs an operation on its input values and their associated weights (e.g., values between 0 and 1, inclusive) to produce an output value. In some cases this operation may involve a dot-product sum of the products of each input value and associated weight. An activation function may be applied to the result of the dot-product sum to produce the output value. Other operations are possible.

For example, if a node receives input values $\{x_1, x_2, \ldots, x_n\}$ on n connections with respective weights of $\{w_1, w_2, \ldots, w_n\}$, the dot-product sum d may be determined as:

$$d = \Sigma_{i=1}^{n} x_i w_i + b \qquad (1)$$

Where b is a node-specific or layer-specific bias.

Notably, the fully-connected nature of ANN 300 can be used to effectively represent a partially-connected ANN by giving one or more weights a value of 0. Similarly, the bias can also be set to 0 to eliminate the b term.

An activation function, such as the logistic function, may be used to map d to an output value y that is between 0 and 1, inclusive:

$$y = \frac{1}{1 + e^{-d}} \qquad (2)$$

Functions other than the logistic function, such as the sigmoid or tan h functions, may be used instead.

Then, y may be used on each of the node's output connections, and will be modified by the respective weights thereof. Particularly, in ANN 300, input values and weights are applied to the nodes of each layer, from left to right until final output values 312 are produced. If ANN 300 has been fully trained, final output values 312 are a proposed solution to the problem that ANN 300 has been trained to solve. In order to obtain a meaningful, useful, and reasonably accurate solution, ANN 300 requires at least some extent of training.

B. Training

Training an ANN may involve providing the ANN with some form of supervisory training data, namely sets of input values and desired, or ground truth, output values. For example, supervisory training to enable an ANN to perform image processing tasks can involve providing pairs of images that include a training image and a corresponding ground truth mask that represents a desired output (e.g., desired segmentation) of the training image. For ANN 300, this training data may include m sets of input values paired with output values. More formally, the training data may be represented as:

$$\{X_{1,i}, X_{2,i}, X_{3,i}, \overline{Y_{1,i}}, \overline{Y_{2,i}}\} \qquad (3)$$

Where $i=1 \ldots m$, and $\overline{Y_{1,i}}$ and $\overline{Y_{2,i}}$ are the desired output values for the input values of $X_{1,i}$, $X_{2,i}$, and $X_{3,i}$.

The training process involves applying the input values from such a set to ANN 300 and producing associated output values. A loss function can be used to evaluate the error between the produced output values and the ground truth output values. In some instances, this loss function may be a sum of differences, mean squared error, or some other metric. In some cases, error values are determined for all of the m sets, and the error function involves calculating an aggregate (e.g., an average) of these values.

Once the error is determined, the weights on the connections are updated in an attempt to reduce the error. In simple terms, this update process should reward "good" weights and penalize "bad" weights. Thus, the updating should distribute the "blame" for the error through ANN 300 in a fashion that results in a lower error for future iterations of the training data. For example, the update process can involve modifying at least one weight of ANN 300 such that subsequent applications of ANN 300 on training images generates new outputs that more closely match the ground truth masks that correspond to the training images.

The training process continues applying the training data to ANN 300 until the weights converge. Convergence occurs when the error is less than a threshold value or the change in the error is sufficiently small between consecutive iterations of training. At this point, ANN 300 is said to be "trained" and can be applied to new sets of input values in order to predict output values that are unknown. When trained to perform image processing techniques, ANN 300 may produce outputs of input images that closely resemble ground truths (i.e., desired results) created for the input images.

Many training techniques for ANNs make use of some form of backpropagation. During backpropagation, input signals are forward-propagated through the network the outputs, and network errors are then calculated with respect to target variables and back-propagated backwards towards the inputs. Particularly, backpropagation distributes the error one layer at a time, from right to left, through ANN 300. Thus, the weights of the connections between hidden layer 308 and output layer 310 are updated first, the weights of the connections between hidden layer 306 and hidden layer 308 are updated second, and so on. This updating is based on the derivative of the activation function.

Figure 3B:
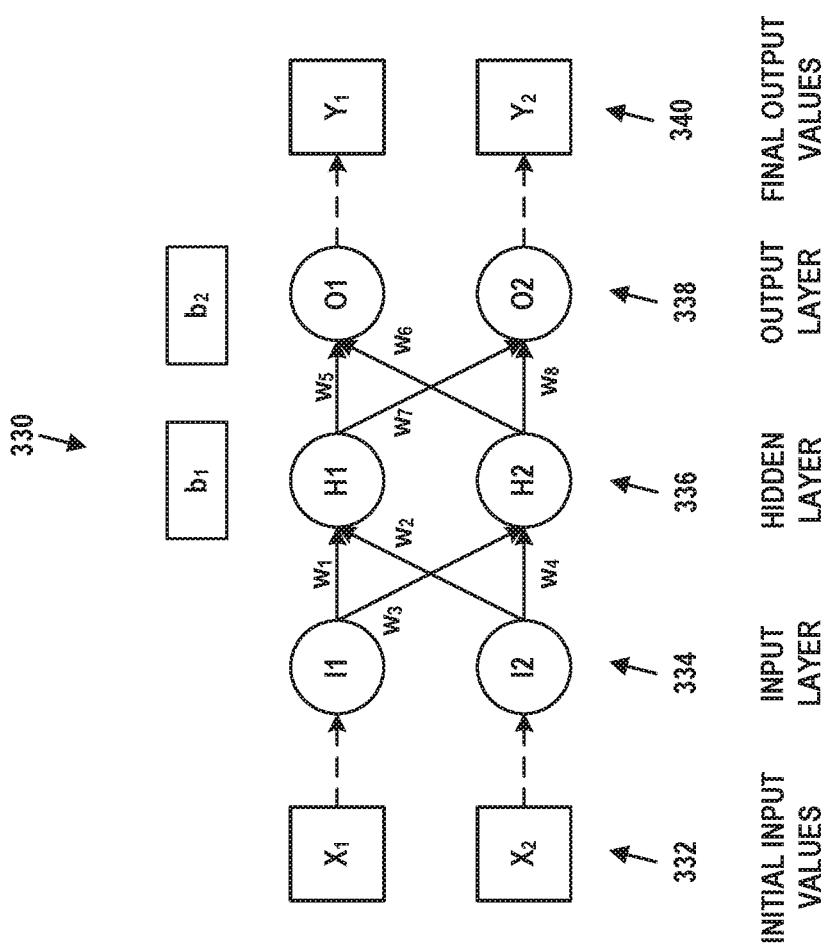
FIG. 3B depicts training an ANN, in accordance with example embodiments.

In order to further explain error determination and backpropagation, it is helpful to look at an example of the process in action. However, backpropagation can become quite complex to represent except on the simplest of ANNs. Therefore, FIG. 3B introduces a very simple ANN 330 in order to provide an illustrative example of backpropagation.

TABLE 1

| Weight | Nodes |
|---|---|
| $w_1$ | I1, H1 |
| $w_2$ | I2, H1 |
| $w_3$ | I1, H2 |
| $w_4$ | I2, H2 |
| $w_5$ | H1, O1 |
| $w_6$ | H2, O1 |
| $w_7$ | H1, O2 |
| $w_8$ | H2, O2 |

ANN 330 consists of three layers, input layer 334, hidden layer 336, and output layer 338, each having two nodes. Initial input values 332 are provided to input layer 334, and output layer 338 produces final output values 340. Weights have been assigned to each of the connections and biases (e.g., $b_1$, $b_2$ shown in FIG. 3B) may also apply to the net input of each node in hidden layer 336 in some examples. For clarity, Table 1 maps weights to pair of nodes with connections to which these weights apply. As an example, $w_2$ is applied to the connection between nodes I2 and H1, $w_7$ is applied to the connection between nodes H1 and O2, and so on.

The goal of training ANN 330 is to update the weights over some number of feed forward and backpropagation iterations until the final output values 340 are sufficiently close to designated desired outputs. Note that use of a single set of training data effectively trains ANN 330 for just that set. If multiple sets of training data are used, ANN 330 will be trained in accordance with those sets as well.

1. Example Feed Forward Pass

To initiate the feed forward pass, net inputs to each of the nodes in hidden layer 336 are calculated. From the net inputs, the outputs of these nodes can be found by applying the activation function. For node H1, the net input $net_{H1}$ is:

$$net_{H1} = w_1 X_1 + w_2 X_2 + b_1 \quad (4)$$

Applying the activation function (here, the logistic function) to this input determines that the output of node H1, $out_{H1}$ is:

$$out_{H1} = \frac{1}{1+e^{-net_{H1}}} \quad (5)$$

Following the same procedure for node H2, the output $out_{H2}$ can also be determined. The next step in the feed forward iteration is to perform the same calculations for the nodes of output layer 338. For example, net input to node O1, $net_{O1}$ is:

$$net_{O1} = w_5 out_{H1} + w_6 out_{H2} + b_2 \quad (6)$$

Thus, output for node O1, $out_{O1}$ is:

$$out_{O1} = \frac{1}{1+e^{-net_{O1}}} \quad (7)$$

Following the same procedure for node O2, the output $out_{O2}$ can be determined. At this point, the total error, $\Delta$, can be determined based on a loss function. For instance, the loss function can be the sum of the squared error for the nodes in output layer 508. In other words:

$$\Delta = \Delta_{O1} + \Delta_{O2} = \frac{1}{2}(out_{O1} - \hat{Y}_1)^2 + \frac{1}{2}(out_{O2} - \hat{Y}_2)^2 \quad (8)$$

The multiplicative constant ½ in each term is used to simplify differentiation during backpropagation. Since the overall result is scaled by a learning rate anyway, this constant does not negatively impact the training. Regardless, at this point, the feed forward iteration completes and backpropagation begins.

2. Backpropagation

As noted above, a goal of backpropagation is to use $\Delta$ (i.e., the total error determined based on a loss function) to update the weights so that they contribute less error in future feed forward iterations. As an example, consider the weight $w_5$. The goal involves determining how much the change in $w_5$ affects $\Delta$. This can be expressed as the partial derivative $$\frac{\partial \Delta}{\partial w_5}.$$

Using the chain rule, this term can be expanded as:

$$\frac{\partial \Delta}{\partial w_5} = \frac{\partial \Delta}{\partial out_{O1}} \times \frac{\partial out_{O1}}{\partial net_{O1}} \times \frac{\partial net_{O1}}{\partial w_5} \quad (9)$$

Thus, the effect on $\Delta$ of change to $w_5$ is equivalent to the product of (i) the effect on $\Delta$ of change to $out_{O1}$, (ii) the effect on $out_{O1}$ of change to $net_{O1}$, and (iii) the effect on $net_{O1}$ of change to $w_5$. Each of these multiplicative terms can be determined independently. Intuitively, this process can be thought of as isolating the impact of $w_5$ on $net_{O1}$, the impact of $net_{O1}$ on $out_{O1}$, and the impact of $out_{O1}$ on $\Delta$.

This process can be repeated for the other weights feeding into output layer 338. Note that no weights are updated until the updates to all weights have been determined at the end of backpropagation. Then, all weights are updated before the next feed forward iteration.

After updates to the remaining weights, $w_1$, $w_2$, $w_3$, and $w_4$ are calculated, backpropagation pass is continued to hidden layer 336. This process can be repeated for the other weights feeding into output layer 338. At this point, the backpropagation iteration is over, and all weights have been updated. ANN 330 may continue to be trained through subsequent feed forward and backpropagation iterations. In some instances, after over several feed forward and backpropagation iterations (e.g., thousands of iterations), the error can be reduced to produce results proximate the original desired results. At that point, the values of $Y_1$ and $Y_2$ will be close to the target values. As shown, by using a differentiable loss function, the total error of predictions output by ANN 330 compared to desired results can be determined and used to modify weights of ANN 330 accordingly.

In some cases, an equivalent amount of training can be accomplished with fewer iterations if the hyper parameters of the system (e.g., the biases $b_1$ and $b_2$ and the learning rate $\alpha$) are adjusted. For instance, the setting the learning rate closer to a particular value may result in the error rate being reduced more rapidly. Additionally, the biases can be updated as part of the learning process in a similar fashion to how the weights are updated.

Regardless, ANN 330 is just a simplified example. Arbitrarily complex ANNs can be developed with the number of nodes in each of the input and output layers tuned to address specific problems or goals. Further, more than one hidden layer can be used and any number of nodes can be in each hidden layer.

III. Convolutional Neural Networks

A convolutional neural network (CNN) is similar to an ANN, in that the CNN can consist of some number of layers of nodes, with weighted connections there between and possible per-layer biases. The weights and biases may be updated by way of feed forward and backpropagation procedures discussed above. A loss function may be used to compare output values of feed forward processing to desired output values.

On the other hand, CNNs are usually designed with the explicit assumption that the initial input values are derived from one or more images. In some embodiments, each color channel of each pixel in an image patch is a separate initial input value. Assuming three color channels per pixel (e.g., red, green, and blue), even a small 32×32 patch of pixels will result in 3072 incoming weights for each node in the first hidden layer. Clearly, using a naïve ANN for image processing could lead to a very large and complex model that would take long to train.

Instead, CNNs are designed to take advantage of the inherent structure that is found in almost all images. In particular, nodes in a CNN are only connected to a small number of nodes in the previous layer. This CNN architecture can be thought of as three dimensional, with nodes arranged in a block with a width, a height, and a depth. For example, the aforementioned 32×32 patch of pixels with 3 color channels may be arranged into an input layer with a width of 32 nodes, a height of 32 nodes, and a depth of 3 nodes.

Figure 4A:
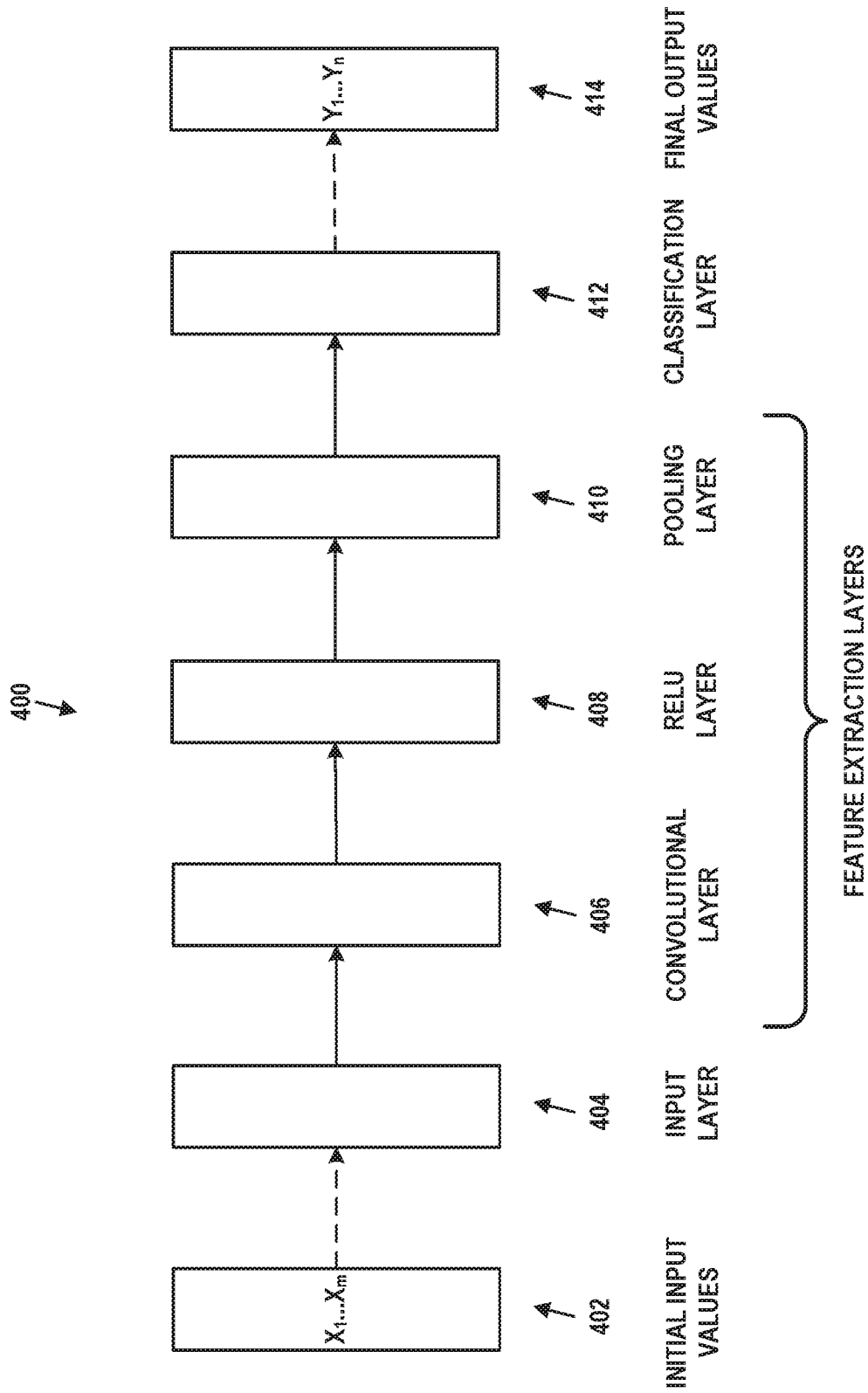
FIG. 4A depicts a convolution neural network (CNN) architecture, in accordance with example embodiments.

An example CNN 400 is shown in FIG. 4A. Initial input values 402, represented as pixels $X_1 \ldots X_m$, are provided to input layer 404. As discussed above, input layer 404 may have three dimensions based on the width, height, and number of color channels of pixels $X_1 \ldots X_m$. Input layer 404 provides values into one or more sets of feature extraction layers, each set containing an instance of convolutional layer 406, RELU layer 408, and pooling layer 410. The output of pooling layer 410 is provided to one or more classification layers 412. Final output values 414 may be arranged in a feature vector representing a concise characterization of initial input values 402.

Convolutional layer 406 may transform its input values by sliding one or more filters around the three-dimensional spatial arrangement of these input values. A filter is represented by biases applied to the nodes and the weights of the connections there between, and generally has a width and height less than that of the input values. The result for each filter may be a two-dimensional block of output values (referred to as an feature map) in which the width and height can have the same size as those of the input values, or one or more of these dimensions may have different size. The combination of each filter's output results in layers of feature maps in the depth dimension, in which each layer represents the output of one of the filters.

Figure 4B:
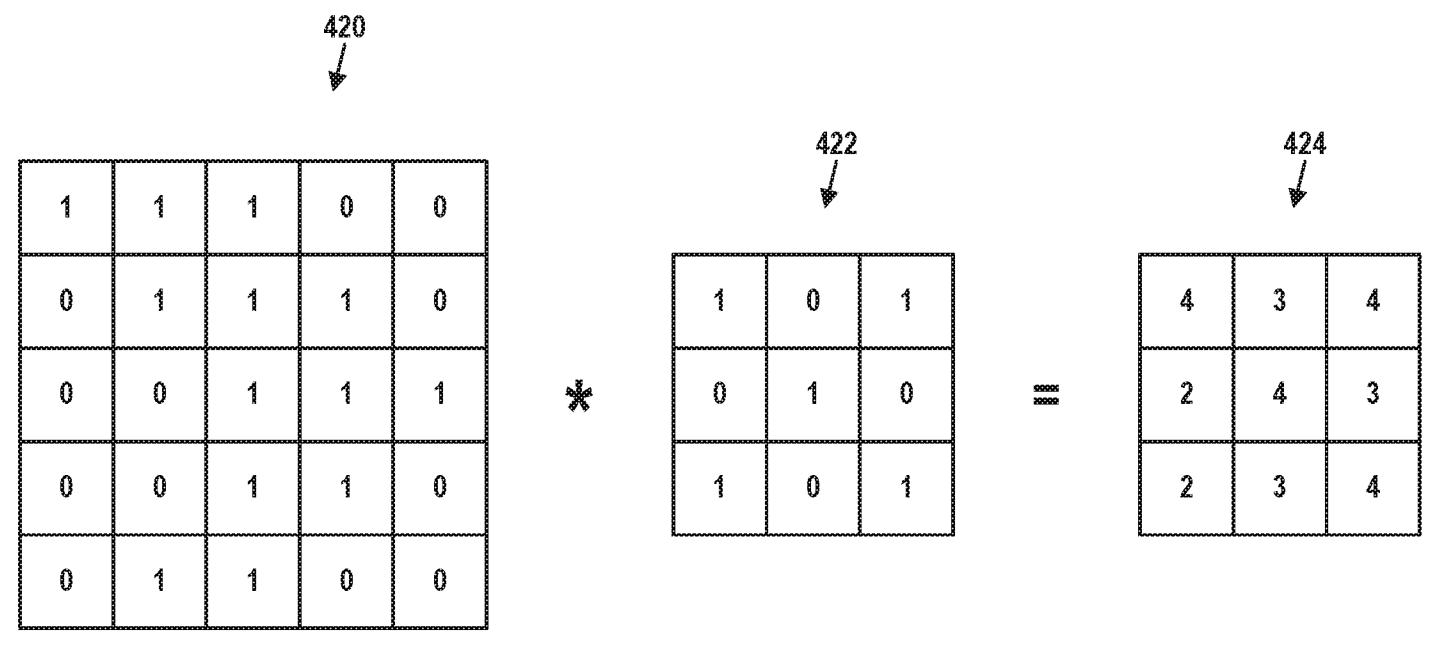

Applying the filter may involve calculating the dot-product sum between the entries in the filter and a two-dimensional depth slice of the input values. An example of this is shown in FIG. 4B. Matrix 420 represents input to a convolutional layer, and thus could be image data, for example. The convolution operation overlays filter 422 on matrix 420 to determine output 424. For instance, when filter 422 is positioned in the top left corner of matrix 420, and the dot-product sum for each entry is calculated, the result is 4. This is placed in the top left corner of output 424.

Turning back to FIG. 4A, a CNN learns filters during training such that these filters can eventually identify certain types of features at particular locations in the input values. As an example, convolutional layer 406 may include a filter that is eventually capable of detecting edges and/or colors in the image patch from which initial input values 402 were derived. A hyper-parameter called receptive field determines the number of connections between each node in convolutional layer 406 and input layer 404. This allows each node to focus on a subset of the input values.

RELU layer 408 applies an activation function to output provided by convolutional layer 406. In practice, it has been determined that the rectified linear unit (RELU) function, or a variation thereof, appears to provide strong results in CNNs. The RELU function is a simple thresholding function defined as $f(x)=\max(0, x)$. Thus, the output is 0 when x is negative, and x when x is non-negative. A smoothed, differentiable approximation to the RELU function is the softplus function. It is defined as $f(x)=\log(1+e^x)$. Nonetheless, other functions may be used in this layer.

Pooling layer 410 reduces the spatial size of the data by down-sampling each two-dimensional depth slice of output from RELU layer 408. One possible approach is to apply a 2×2 filter with a stride of 2 to each 2×2 block of the depth slices. This will reduce the width and height of each depth slice by a factor of 2, thus reducing the overall size of the data by 75%.

Classification layer 412 computes final output values 414 in the form of a feature vector. As an example, in a CNN trained to be an image classifier, each entry in the feature vector may encode a probability that the image patch contains a particular class of item (e.g., a human face, a cat, a beach, a tree, etc.).

In some embodiments, there are multiple sets of the feature extraction layers. Thus, an instance of pooling layer 410 may provide output to an instance of convolutional layer 406. Further, there may be multiple instances of convolutional layer 406 and RELU layer 408 for each instance of pooling layer 410.

CNN 400 represents a general structure that can be used in image processing. Convolutional layer 406 and classification layer 412 apply weights and biases similarly to layers in ANN 300, and these weights and biases may be updated during backpropagation so that CNN 400 can learn. On the other hand, RELU layer 408 and pooling layer 410 generally apply fixed operations and thus might not learn.

Not unlike an ANN, a CNN can include a different number of layers than is shown in the examples herein, and each of these layers may include a different number of nodes. Thus, CNN 400 is merely for illustrative purposes and should not be considered to limit the structure of a CNN.

Figure 5:
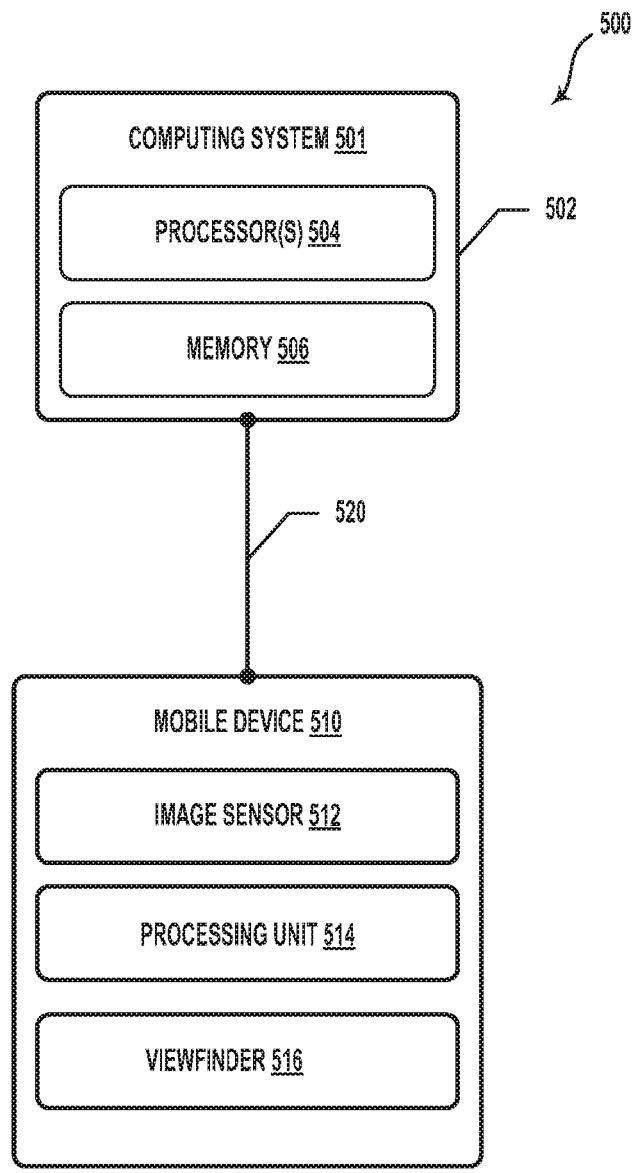
FIG. 5 depicts a system involving an ANN and a mobile device, in accordance with example embodiments.

FIG. 5 depicts system 500 involving an ANN operating on computing system 502 and mobile device 510 in accordance with example embodiments.

The ANN operating on computing system 502 may correspond to ANN 300 or ANN 330 described above. For example, the ANN could be configured to execute instructions so as to carry out operations described, including learning one or more neural light transports. In some examples, the ANN may represent a CNN (e.g., CNN 400), a feedforward ANN, a gradient descent based activation function ANN, or a regulatory feedback ANN, among other types.

As an example, the ANN could determine a plurality of processing parameters or techniques based on data derived from UV texture maps and geometry obtained from an object using a light stage. For example, ANN 502 could be subject to a machine-learning process to "learn" how to manipulate textures, perspectives, and lighting of one or more objects like human professionals. The size of the dataset used can vary within examples.

In some examples, the dataset may depend on the arrangement of the light stage. For instance, the quantity of lights and quantity of perspectives captured could differ depending on the light stage used to develop the dataset.

Figure 6:
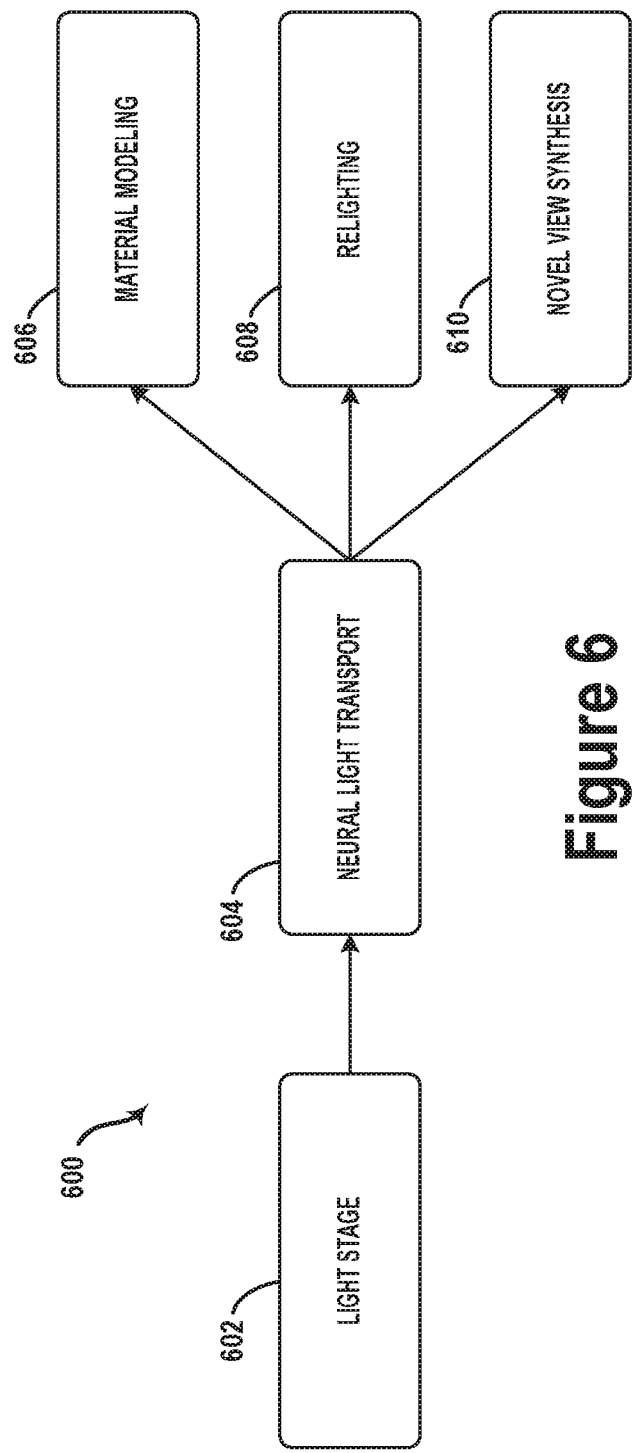
FIG. 6 illustrates a system implementing a neural light transport in accordance with example embodiments.

FIG. 6 illustrates a system implementing a neural light transport in accordance with example embodiments. System 600 may be implemented by one or more computing systems (e.g., computing system 100 shown in FIG. 1) and may involve one or more features, such as light stage 602, neural light transport 604, material modeling 606, relighting 608, and synthesized perspective 610. In other examples, system 600 may include other features or aspects in different arrangements.

System 600 may represent an example system that uses one or more computing systems to one or more neural networks to model how light transports in a 3D scene. Particularly, system 600 may enable performance of material editing, relighting, and novel view synthesis of one or more objects using a trained neural network. In some examples, the trained neural network may execute on various computing devices, such as wearable computing devices, smartphones, laptop computers, and servers. For instance, a first computing system may train the neural network and provide the trained neural network to a second computing system.

Light stage 602 may involve the development of data (also referred herein as a dataset) that can be used to train one or more neural networks. The data may be developed using a physical light stage environment that includes lights positioned at various locations relative to the stage and one or more cameras positioned at perspectives to capture UV texture maps of the object. As such, a physical object may be placed in the structured light stage environment during light stage 602 while one or more cameras capture UV texture maps of the physical object from different perspectives. When each UV texture map is captured, one or more lights positioned relative to the physical object may illuminate the physical object. As such, the data captured during light stage 602 may indicate the perspective of the camera and pose of the light or lights used to illuminate the object during each image represented in the data. In some examples, capturing a UV texture map of the object may involve one or more cameras capturing images of the object that can be used to develop the UV texture map.

To further illustrate, an example embodiment may involve using a light stage equipped with a quantity of lights arranged (e.g., 330 lights) at different poses relative to an area where the object being analyzed is placed. Measurements (e.g., images, sensor readings) may be captured of the object from various camera perspectives (e.g., 55 different perspectives) while the lights illuminate the object in a known configuration (e.g., one light at a time). As such, the data generated from the sensor or camera measurements along with known poses and perspectives of the light(s) and camera used for each image may be gathered to develop a dataset to train one or more neural networks to learn a neural light transport as shown in neural light transport 604.

Once data is obtained, system 600 may fit one or more neural networks to the observations within the data to train the neural network(s). Training the neural network(s) may cause the network(s) to learn a function, such as the function as follows:

$$f(x, \omega_i, \omega_o) \tag{10}$$

This function, which may be a continuous function, is referred to herein as a neural light transport or light transport function. The function can be determined and implemented by one or more neural networks. As shown above, the light transport function is a six-dimensional function arranged as follows: (i) two degrees of freedom represented by x that describe the location on the object surface; (ii) two degrees of freedom represented by $\omega_i$ that define the incident light direction, and (iii) two remaining degrees of freedom represented by $\omega_o$ that describe the viewing direction.

After training a neural network to learn the neural light transport function, system 600 may query the function to perform different operations. For example, querying the function with x can result in the neural network performing material modeling 606. Material modeling 606 may involve modeling the object with spatially-varying material modeling, where each pixel in the image may change according to the material, camera viewpoint and lighting direction. For most of the real-world objects, if we traverse on the object surface, e.g., the surface of a kitchen knife, we would observe multiple materials, e.g., the metal blade vs. the wooden handle, (hence, "spatially-varying").

Querying the function with $\omega_i$ can cause the neural network to render the scene of the physical object with novel lighting during relighting 608. Querying the function with $\omega_o$, the neural network may generate a perspective of the scene using a UV texture map from a camera view defined in the query as shown in synthesis operation 610. The final image rendering is obtained by applying the inferred UV texture map to the 3D object.

FIGS. 7A, 7B, 7C, and 7D illustrate an implementation using a neural light transport in accordance with example embodiments. Particularly, the implementation may be performed by system 600 shown in FIG. 6 and/or one or more computing systems (e.g., computing system 100 shown in FIG. 1). As such, the example implementation illustrates the development and use of a neural light transport with respect to a bunny and a dragon serving as the object. In other examples, different objects may be used to develop the neural light transport.

Figure 7A:
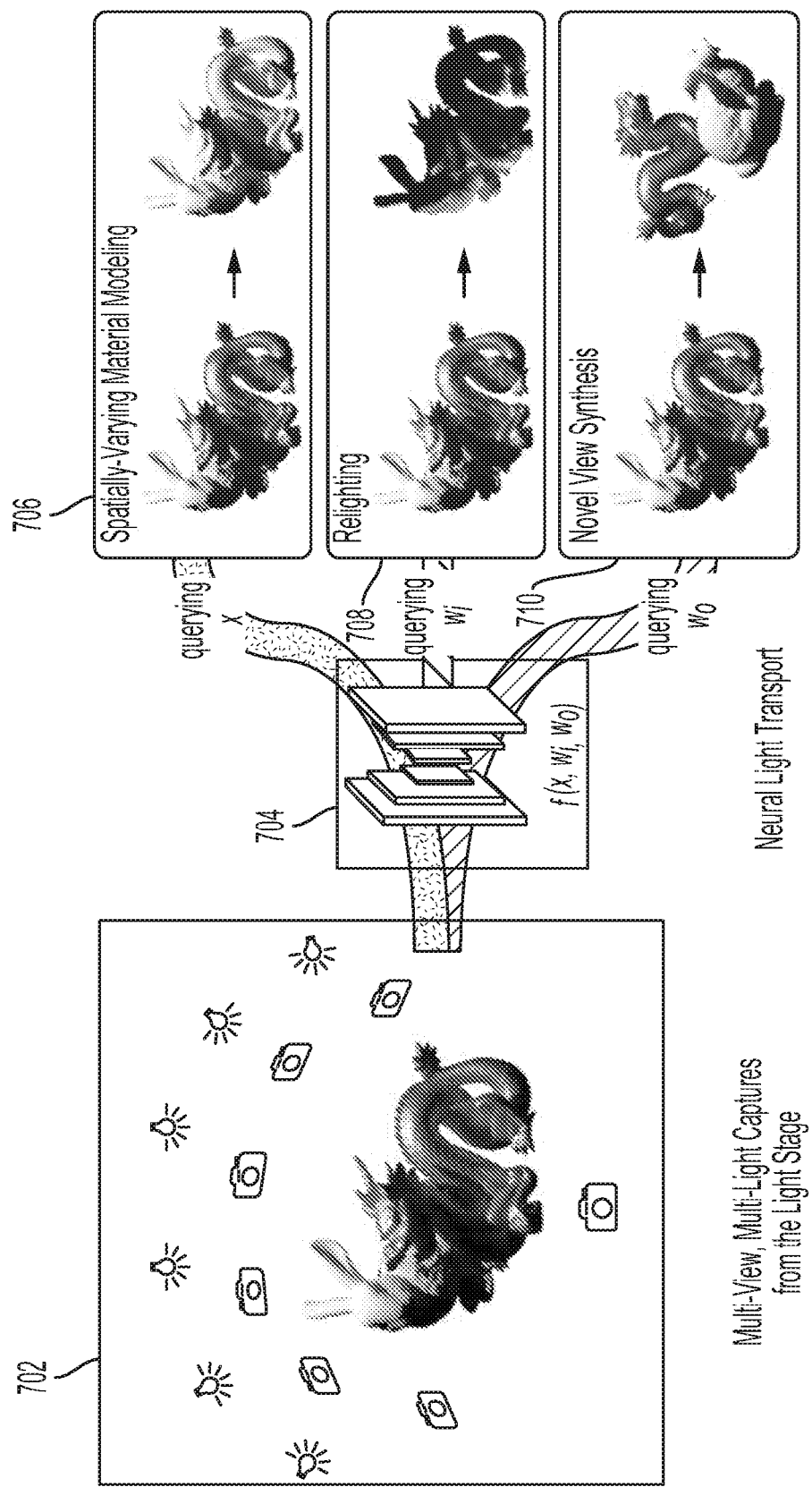
FIG. 7A shows a set of operations for implementing a neural light transport in accordance with example embodiments.

FIG. 7A shows a set of operations for implementing a neural light transport in accordance with example embodiments. As shown, a system (e.g., the system 600 shown in FIG. 6) may use a neural network to model how light transports in a 3D scene involving the bunny and dragon. This enables the system or another device to perform material editing, relighting, and novel view synthesis using the trained network as discussed above with respect to system 600 shown in FIG. 6.

As shown, light stage 702 may involve capturing images of the bunny and dragon using lights and cameras positioned at different poses to develop data to train a neural network. For instance, light stage 702 may involve positioning the bunny and dragon in a light stage setup that enables lights and cameras to illuminate and capture images of the bunny and dragon from different perspectives while using various illumination techniques (e.g., one light at a time).

Neural light transport 704 may be developed by one or more neural networks executing on one or more computing systems. Particularly, the data generated during light stage 702 may enable a neural network to develop neural light transport $f(x, \omega_i, \omega_o)$ described above with respect to FIG. 6.

The light transport function may be defined on the object surface. Therefore, the light transport can be expressed as high-dimensional UV maps. UV mappings correspond to the 3D modeling process of projecting a two-dimensional (2D) image to a 3D model's surface for texture mapping. As such, the letters "U" and "V" are used to denote the axes of the 2D texture because "X", "Y", and "Z" are typically used to denote the axes of the 3D object in model space. UV texturing can permit polygons that make up a 3D object to be painted (or redesigned) with color (and other surface attributes) from an ordinary image. The image is often called a UV texture map.

The UV mapping process may involve assigning pixels in the image to surface mappings on the polygon, usually done by "programmatically" copying a triangular piece of the image map and pasting it onto a triangle of the object. UV texturing represents an alternative to projection mapping, which involves using any pair of the model's X, Y, Z coordinates or any transformation of the position. UV texturing involves mapping into a texture space rather than into the geometric space of the object. As a result, the rendering computation uses the UV texture coordinates to determine how to paint the 3D surface. For each UV location, there is a four-dimensional function that uses lighting directions ($\omega_i$) and viewing directions ($\omega_o$) as inputs and outputs a red, green, blue (RGB) color.

As shown, variables of the light transport function may be queried to manipulate the output of the neural network. For instance, querying x can cause the neural network to model spatially-varying materials 706. This enables the application material editing: changing the dragon's material to that of the bunny. This may enable the neural network to determine how light may impact the appearance of different materials from different perspectives.

Querying $\omega_i$ may enable the neural network to adjust the illumination applied to the dragon and bunny as shown for relighting 708. Relighting 708 may enable the neural network to show how the bunny and the dragon may appear under different lighting conditions. Querying $\omega_o$ may cause the neural network to provide the dragon and the bunny from a synthesized perspective as shown in novel view synthesis 710. For novel view synthesis 710, the neural network may show the dragon and/or the bunny from a different perspective (e.g., turned 180 degrees) with or without a novel lighting applied.

Figure 7B:
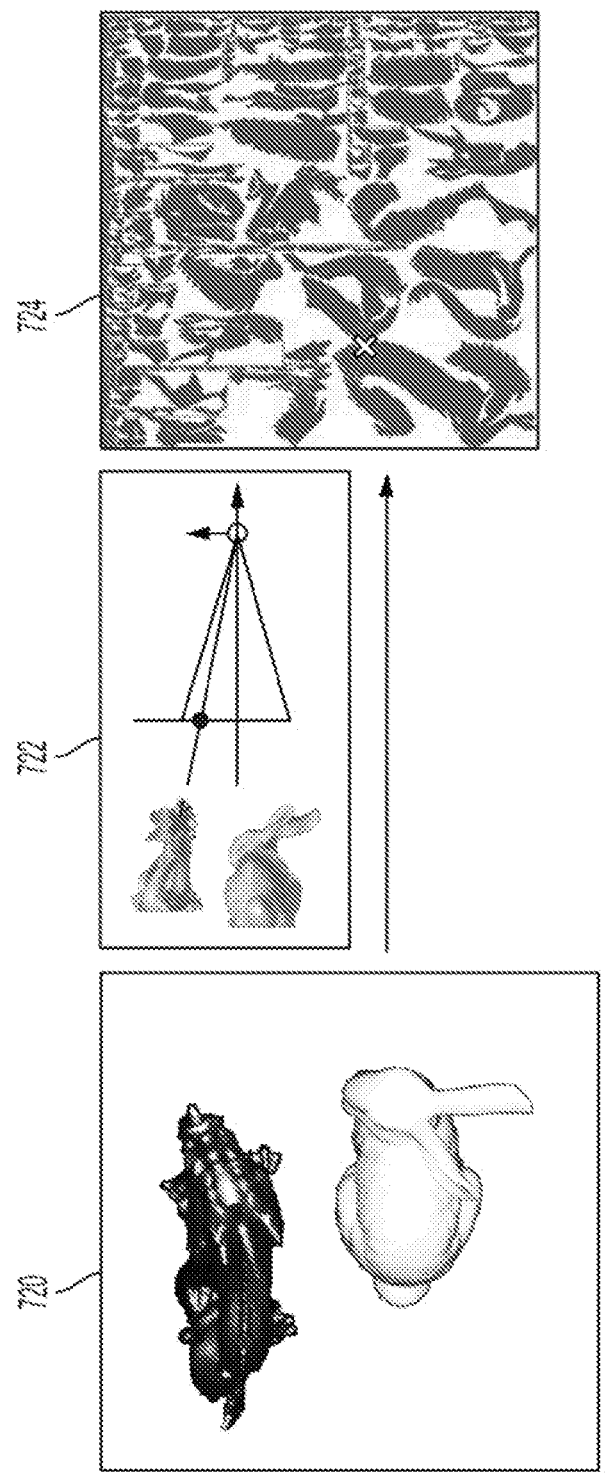
FIG. 7B illustrates ray casting to determine 3D pixel projections in accordance with example embodiments.

FIG. 7B illustrates ray casting to determine 3D pixel projections in accordance with example embodiments. The system may use knowledge of the geometry of the objects in image 720 along with positions of cameras relative to the light to perform ray casting 722. Particularly, ray casting may determine where each pixel projects to in 3D space 724.

With ray casting 722, each pixel can be traced to a 3D point on the object surface. It is also predefined to which UV location each 3D point maps. Chaining these two together gives a mapping from each pixel to a UV location. This correspondence is used to generate the UV counterpart of the object rendering.

Figure 7C:
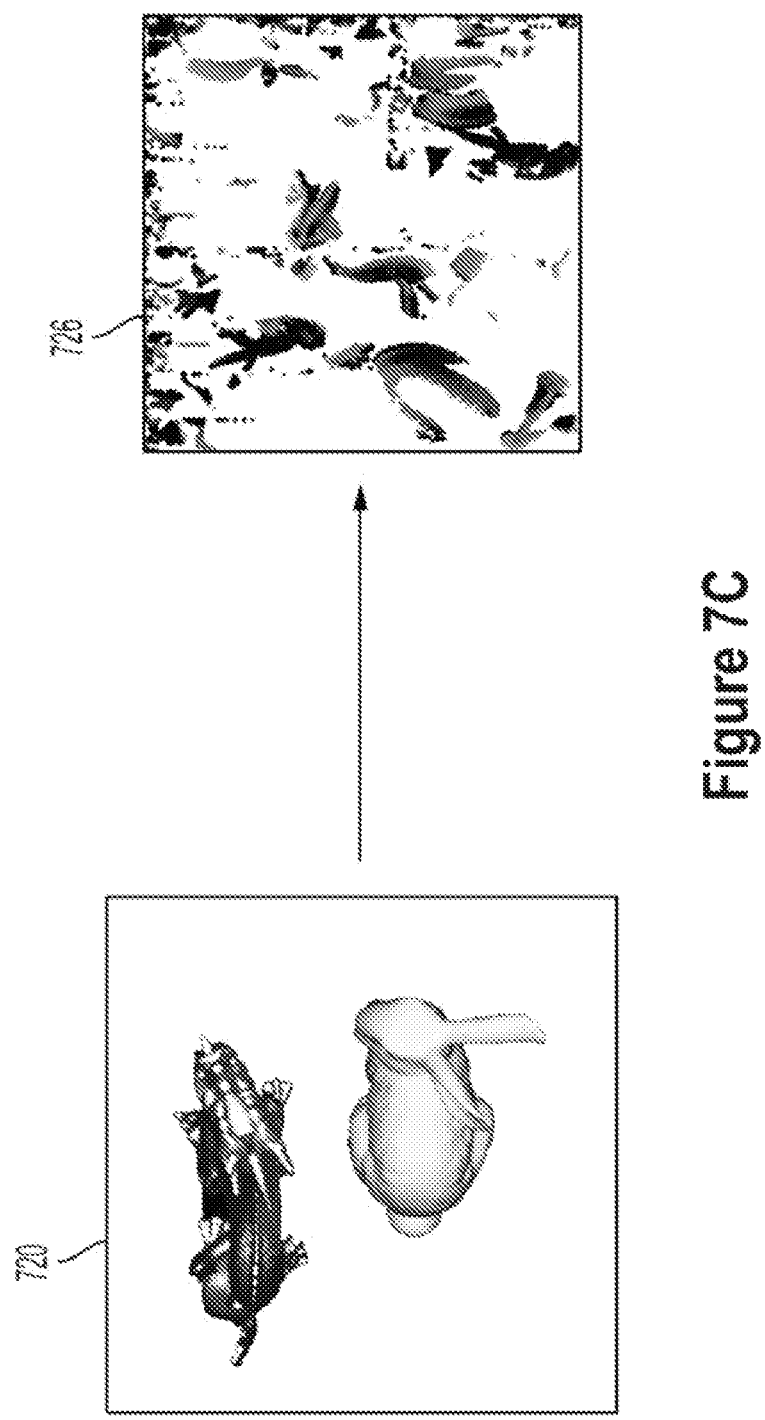
FIG. 7C illustrates a connection of an object rendering to the counterpart of the object in the UV space in accordance with example embodiments.

FIG. 7C illustrates a connection of an object rendering to the counterpart of the object in the UV space in accordance with example embodiments. As shown, the neural network may use information within the data (e.g., light and camera pose information) and the images to cause the light transport function to produce a UV map of red, green, blue (RGB) values 726. In particular, each texel may encode a 4D function as follows:

As such, the neural network may use image 720 to perform the light transport function to generate UV map 726. This UV texture provides multi-view correspondences across different views without an explicitly search among views.

For each 3D point on the surface as shown, the system can map the point on a UV map based on the predefined UV unwrapping process. Hence, the system may estimate on the UV map where each pixel on the original RGB render should go to. By rearranging the pixel values, the system may determine the UV-space RGB map 726 as shown.

Figure 7D:
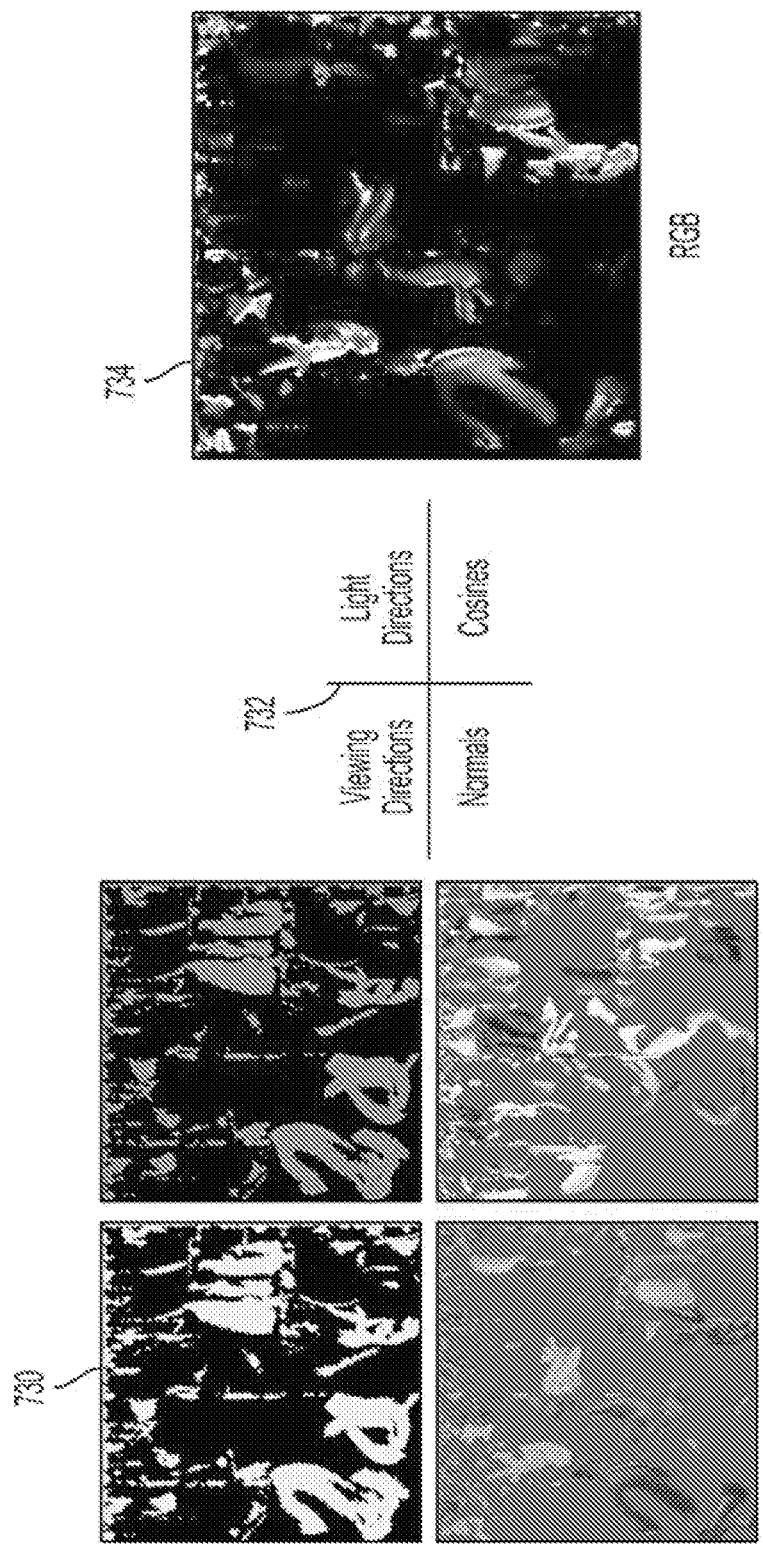
FIG. 7D illustrates a rendering process in accordance with example embodiments.

FIG. 7D illustrates a rendering process in accordance with example embodiments. The system may repeat the above process to produce UV buffers, which are intermediate buffers used by graphics engines to produce the final renders, for the scene. That is, the system can project viewing directions, light directions, normals, and cosine terms 730 as represented by actions 732 to the UV space. These maps may be described as "UV buffers," in analogy to "Z buffers" in traditional graphics. Thus, the networks take in these UV buffers, and aim to generate the UV RGB 734 (shown on the right).

Figure 8:
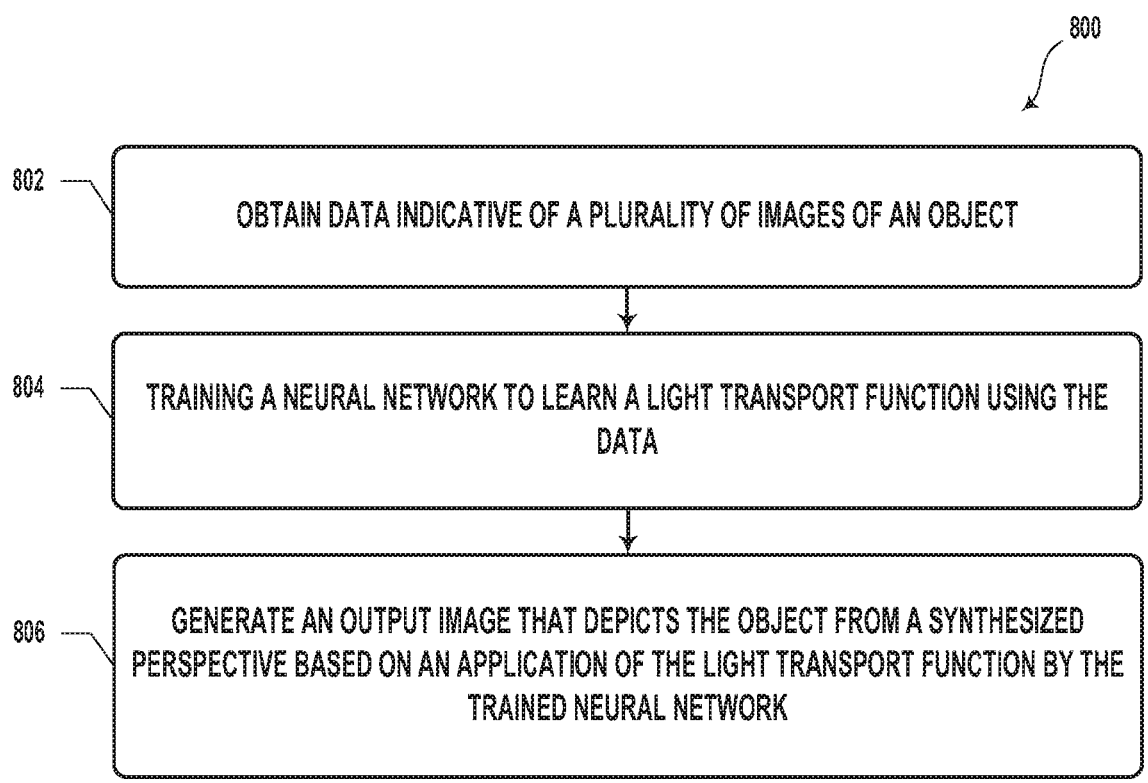
FIG. 8 is a flow chart of a method for implementing a neural light transport function in accordance with example embodiments.

FIG. 8 is a flow chart of a method 800 for implementing a neural light transport function in accordance with example embodiments. Method 800 may include one or more operations, functions, or actions as illustrated by one or more of blocks 802, 804, and 806. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, a tangible storage device, or other article of manufacture, for example. Furthermore, for method 800 and other processes and methods disclosed herein, each block in FIG. 8 may represent circuitry that is wired to perform the specific logical functions in the process.

At block 802, the method 800 involves obtaining data indicative of a plurality of UV texture maps and a geometry of an object. Each UV texture map may depict the object from a perspective of various perspectives. A computing system, such as a smartphone, a camera, or a server may obtain data that represents images of the object.

In some examples, the plurality of UV texture maps may be obtained using a light stage. Particularly, the light stage may include a quantity of lights (e.g., dozens, hundreds) to illuminate the object in a sequential order (e.g., one at a time) as one or more cameras capture images of the object. These images may be used for subsequent generation of the UV texture maps. As such, the light stage may enable the data to specify information to associate with each image, such as what light was illuminating the object and which perspective the image was taken from. By illuminating the object in a one-light-at-a-time, known sequential order using the various lights and capturing images from the various perspectives, the data may be accumulated for subsequent use.

In addition, the computing system may obtain data indicative of the geometry of the object from one or more sensors. For example, the computing system may obtain the data from a photometric stereo and depth sensor. The one or more sensors may include various types of sensors configured to measure physical aspects of the object. These sensors may be part of the light stage in some examples.

At block 804, the method 800 involves training a neural network to learn a light transport function using the data. For example, a computing system may train the neural network to learn the light transport function based on information specifying light position and perspective associated with each UV texture map. In addition, the neural network may be trained such that an output of the light transport function depends on one or more materials of the object.

The light transport function may be a continuous function that specifies how light interacts with the object when the object is viewed from the plurality of perspectives. As indicated above, the data may associate a particular lighting and perspective with each image to generate the UV texture maps. By gathering and analyzing data from multiple images (e.g., dozens, hundreds, thousands) along with geometric information, one or more neural networks may learn how to express the information in the form of the light transport function. As such, the light transport function can enable estimation of novel lighting and perspectives of the object.

At block 806, the method 800 involves generating an output UV texture map that depicts the object from a synthesized perspective based on an application of the light transport function by the trained neural network. In some instances, the synthesized perspective may include a novel lighting applied to the object and/or a novel view of the object. For example, the synthesized perspective may include an application of spatially-varying material modeling applied to the object. In addition, the output image may involve a relighting application illuminating the object within the output image. In some examples, the synthesized perspective may represent the object with one or more modifications to the materials of the object.

In some examples, generating the output UV texture map may involve determining a synthesis of a texture of the object from a particular perspective with a particular lighting. For instance, the particular perspective may differ from the plurality of perspectives. In addition, the computing system may also relight a 3D model of the object based on the determined synthesis of the texture of the object and generate an output image that depicts the object such that the object includes a new material based on the relight of the 3D model.

In some examples, the method 800 further involves determining an output image depicting the synthesized perspective of the object based on the output UV texture map and displaying the output image on a display interface. For instance, the computing system (or another computing system) may include a display interface to display the output image. In addition, the method 800 may further involve providing the trained neural network to a second computing system. For instance, a server may train the neural network and send the trained neural network to a smartphone for local performance.

Figure 9:
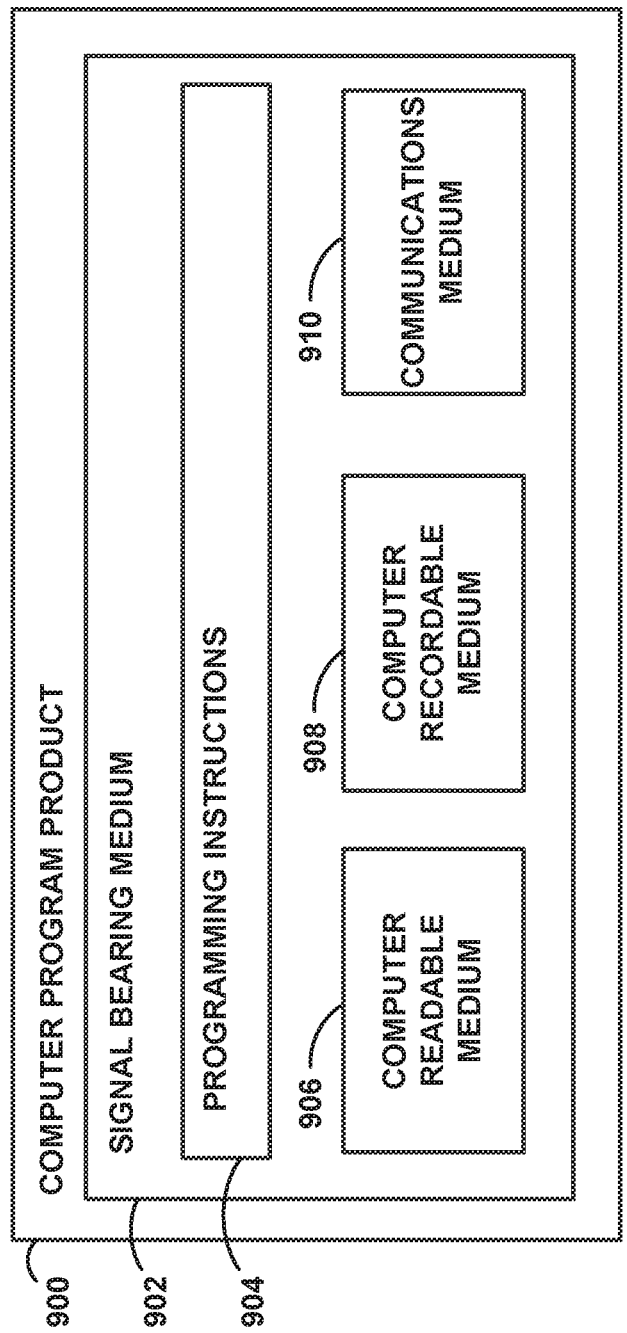
FIG. 9 is a schematic illustrating a conceptual partial view of a computer program for executing a computer process on a computing system, arranged according to at least some embodiments presented herein

FIG. 9 is a schematic illustrating a conceptual partial view of a computer program for executing a computer process on a computing system, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 900 is provided using signal bearing medium 902, which may include one or more programming instructions 904 that, when executed by one or more processors may provide functionality or portions of the functionality described above with respect to FIGS. 1-8. In some examples, the signal bearing medium 902 may encompass a non-transitory computer-readable medium 906, such as, but not limited to, a hard disk drive, a Compact Disc (CD), a Digital Video Disk (DVD), a digital tape, memory, etc. In some implementations, the signal bearing medium 902 may encompass a computer recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 100 of FIG. 1 may be configured to provide various operations, functions, or actions in response to the programming instructions 904 conveyed to the computer system 100 by one or more of the computer readable medium 906, the computer recordable medium 908, and/or the communications medium 910.

The non-transitory computer readable medium could also be distributed among multiple data storage elements, which could be remotely located from each other. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   obtaining, at a computing system, data indicative of a plurality of UV texture maps and a geometry of an object, wherein each UV texture map depicts the object from a perspective of a plurality of perspectives;
   training, by the computing system, a neural network using training data, wherein the training data comprises the data indicative of the plurality of UV texture maps and the geometry of the object, wherein the training causes the neural network to learn a light transport function, wherein the light transport function specifies how light interacts with the object when the object is viewed from the plurality of perspectives; and
   generating, by the computing system, an output UV texture map that depicts the object from a synthesized perspective based on an application of the light transport function by the trained neural network.

2. The method of claim 1, wherein obtaining data representing the plurality of UV texture maps and the geometry of the object comprises:
   obtaining the plurality of UV texture maps using a light stage, wherein the light stage includes a plurality of lights arranged to illuminate the object in a sequential order as one or more cameras capture images of the object for subsequent generation of the plurality of UV texture maps.

3. The method of claim 1, wherein obtaining data representing the plurality of UV texture maps and the geometry of the object comprises:
   obtaining data indicative of the geometry of the object from a sensor.

4. The method of claim 3, wherein obtaining data indicative of the geometry of the object from the sensor comprises:
   obtaining data indicative of the geometry of the object from a photometric stereo and depth sensor.

5. The method of claim 1, wherein the training data further comprises:
   information specifying a position of a light and a perspective of a camera capturing an image of the object.

6. The method of claim 1, wherein training the neural network comprises:
   training the neural network such that an output of the light transport function depends on one or more materials of the object.

7. The method of claim 1, wherein generating the output UV texture map that depicts the object from the synthesized perspective comprises:
   generating the output UV texture map that depicts the object such that the synthesized perspective includes an application of spatially-varying material modeling to the object.

8. The method of claim 7, wherein generating the output UV texture map that depicts the object such that the synthesized perspective includes the application of spatially-varying material modeling to the object comprises:
   modifying a material of the object for the synthesized perspective.

9. The method of claim 1, wherein generating the output UV texture map that depicts the object from the synthesized perspective comprises:
   generating the output UV texture map that depicts the object from the synthesized perspective such that the synthesized perspective includes a novel view of the object.

10. The method of claim 1, wherein generating the output UV texture map that depicts the object from the synthesized perspective comprises:
    generating the output UV texture map that depicts the object from the synthesized perspective such that the synthesized perspective includes a relighting application illuminating the object from a particular perspective of the plurality of perspectives.

11. The method of claim 1, further comprising:
    determining an output image depicting the synthesized perspective of the object based on the output UV texture map; and
    displaying the output image on a display interface.

12. The method of claim 1, further comprising:
    providing the trained neural network to a second computing system.

13. The method of claim 1, wherein generating the output UV texture map that depicts the object from the synthesized perspective comprises:
    determining a synthesis of a texture of the object from a particular perspective with a particular lighting, wherein the particular perspective differs from the plurality of perspectives;
    relighting a three-dimensional (3D) model of the object based on the determined synthesis of the texture of the object; and
    generating an output image that depicts the object such that the object includes a new material.

14. A system comprising:
    a sensor;
    a computing system configured to:
        obtain data indicative of a plurality of UV texture maps and a geometry of an object, wherein each UV texture map depicts the object from a perspective of a plurality of perspectives, and wherein the sensor captures data indicative of the geometry of the object;
        train a neural network using training data, wherein the training data comprises the data indicative of the plurality of UV texture maps and the geometry of the object, wherein the training causes the neural network to learn a light transport function, wherein the light transport function specifies how light interacts with the object when the object is viewed from the plurality of perspectives; and generate an output UV texture map that depicts the object from a synthesized perspective based on an application of the light transport function by the trained neural network.

15. The system of claim 14, further comprising:
a light stage, wherein the computing system is configured to obtain data representing the plurality of UV texture maps using the light stage, and
wherein the light stage includes a plurality of lights arranged to illuminate the object in a sequential order as one or more cameras capture images of the object for subsequent generation of the plurality of UV texture maps.

16. The system of claim 14, wherein the computing system is further configured to:
generate the output UV texture map that depicts the object from the synthesized perspective such that the synthesized perspective includes an application of spatially-varying material modeling to the object.

17. The system of claim 14, wherein the computing system is further configured to:
generate the output UV texture map that depicts the object from the synthesized perspective such that the synthesized perspective includes a novel view of the object.

18. The system of claim 14, wherein the computing system is further configured to:
provide the trained neural network to a second computing system.

19. The system of claim 14, wherein the computing system is further configured to:
determine an output image depicting the synthesized perspective of the object based on the output UV texture map; and
display the output image on a display interface.

20. A non-transitory computer-readable medium configured to store instructions, that when executed by a computing system comprising one or more processors, causes the computing system to perform operations comprising:
obtaining data indicative of a plurality of UV texture maps and a geometry of an object, wherein each UV texture map depicts the object from a perspective of a plurality of perspectives;
training a neural network using training data, wherein the training data comprises the data indicative of the plurality of UV texture maps and the geometry of the object, wherein the training causes the neural network to learn a light transport function, wherein the light transport function specifies how light interacts with the object when the object is viewed from the plurality of perspectives; and
generating an output UV texture map that depicts the object from a synthesized perspective based on an application of the light transport function by the trained neural network.

* * * * *